(12) United States Patent
Boden et al.

(10) Patent No.: US 9,911,521 B2
(45) Date of Patent: Mar. 6, 2018

(54) CURABLE COMPOSITION FOR ELECTRICAL MACHINE, AND ASSOCIATED METHOD

(71) Applicant: General Electric Company, Schenectady, NY (US)

(72) Inventors: Eugene Pauling Boden, Scotia, NY (US); Kevin Warner Flanagan, Troy, NY (US); David Andrew Simon, Johnstown, NY (US); Weijun Yin, Niskayuna, NY (US); Wei Zhang, Ballston Lake, NY (US); Robert Colin McTigue, Niskayuna, NY (US); Kathryn Amanda Misner, Duanesburg, NY (US); Gary William Yeager, Rexford, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/730,510

(22) Filed: Jun. 4, 2015

(65) Prior Publication Data

US 2015/0357086 A1 Dec. 10, 2015

Related U.S. Application Data

(63) Continuation-in-part of application No. 14/297,674, filed on Jun. 6, 2014.

(51) Int. Cl.
*C08G 67/02* (2006.01)
*H01B 7/42* (2006.01)
(Continued)

(52) U.S. Cl.
CPC ............. *H01B 7/421* (2013.01); *C08G 61/12* (2013.01); *C08G 73/0655* (2013.01);
(Continued)

(58) Field of Classification Search
CPC ........... C08G 61/12; C09J 165/00; C09K 5/14
(Continued)

(56) References Cited

U.S. PATENT DOCUMENTS 4,709,008 A 11/1987 Shimp
4,740,584 A 4/1988 Shimp
(Continued)

FOREIGN PATENT DOCUMENTS

| CN | 102942684 A | 2/2013 |
|---|---|---|
| WO | 199620242 A1 | 7/1996 |
| WO | 2008145190 A1 | 12/2008 |

OTHER PUBLICATIONS

Kessler, "Cyanate Ester Resins", Wiley Encyclopedia of Composites, (2012), 15 Pages.
(Continued)

*Primary Examiner* — Jane L Stanley
(74) *Attorney, Agent, or Firm* — GE Global Patent Operation

(57) ABSTRACT

A curable composition for an electrical machine is presented. The curable composition includes: (A) about 10 weight percent to about 30 weight percent of a polyfunctional cyanate ester; (B) about 25 weight percent to about 60 weight percent of a first difunctional cyanate ester, or a prepolymer thereof; (C) about 10 weight percent to about 30 weight percent of a second difunctional cyanate ester, or a prepolymer thereof, and (D) about 5 weight percent to about 25 weight percent of a thermally conductive filler comprising boron nitride. An associated method is also presented.

15 Claims, 2 Drawing Sheets

(51) Int. Cl.
*C09K 5/14* (2006.01)
*H01B 3/30* (2006.01)
*C08G 61/12* (2006.01)
*C08G 73/06* (2006.01)
*C08L 79/04* (2006.01)
*C09J 165/00* (2006.01)

(52) U.S. Cl.
CPC ............... *C08L 79/04* (2013.01); *C09K 5/14* (2013.01); *H01B 3/306* (2013.01); *C09J 165/00* (2013.01)

(58) Field of Classification Search
USPC ...................................................... 524/610
See application file for complete search history.

(56) References Cited

U.S. PATENT DOCUMENTS

| | | | |
|---|---|---|---|
| 4,774,282 A | 9/1988 | Qureshi | |
| 4,839,442 A * | 6/1989 | Craig, Jr. | ............... C07C 261/02 528/422 |
| 5,137,846 A | 8/1992 | MacHuga et al. | |
| 5,162,574 A | 11/1992 | Craig et al. | |
| 5,292,861 A | 3/1994 | Papathomas | |
| 5,494,981 A | 2/1996 | Gorodisher et al. | |
| 5,527,592 A | 6/1996 | Afzali-Ardakani et al. | |
| 5,717,262 A | 2/1998 | Muller et al. | |
| 6,187,886 B1 * | 2/2001 | Husson, Jr. | ............... B32B 7/04 428/473.5 |
| 6,190,775 B1 | 2/2001 | Smith et al. | |
| 6,238,790 B1 | 5/2001 | Smith et al. | |
| 6,384,507 B1 | 5/2002 | Lee et al. | |
| 6,515,383 B1 | 2/2003 | Ognibene et al. | |
| 7,015,260 B2 | 3/2006 | Meloni | |
| 7,033,670 B2 | 4/2006 | Smith | |
| 7,268,293 B2 | 9/2007 | Smith et al. | |
| 7,309,526 B2 | 12/2007 | Smith et al. | |
| 7,547,847 B2 | 6/2009 | Miller | |
| 7,553,438 B2 | 6/2009 | Smith et al. | |
| 7,553,781 B2 | 6/2009 | Smith et al. | |
| 7,592,045 B2 | 9/2009 | Smith et al. | |
| 7,651,963 B2 | 1/2010 | Smith et al. | |
| 7,655,295 B2 | 2/2010 | Smith et al. | |
| 7,776,392 B2 | 8/2010 | Smith et al. | |
| 7,781,057 B2 | 8/2010 | Smith et al. | |
| 7,781,063 B2 | 8/2010 | Smith et al. | |
| 7,816,430 B2 | 10/2010 | Mizuno et al. | |
| 7,837,817 B2 | 11/2010 | Smith et al. | |
| 7,846,853 B2 | 12/2010 | Stevens et al. | |
| 7,851,059 B2 | 12/2010 | Stevens et al. | |
| 7,923,516 B2 | 4/2011 | Ogawa et al. | |
| 7,955,661 B2 | 6/2011 | Stevens et al. | |
| 8,216,672 B2 | 7/2012 | Smith et al. | |
| 2003/0130412 A1 * | 7/2003 | Mizuno | ............... B32B 15/14 524/589 |
| 2006/0232143 A1 * | 10/2006 | Purvines | ............... H02K 1/148 310/43 |
| 2008/0032089 A1 | 2/2008 | Bauer et al. | |
| 2009/0277666 A1 | 11/2009 | Yamauchi et al. | |
| 2010/0305274 A1 * | 12/2010 | Bonneau | ............... C08J 5/24 525/107 |
| 2011/0048776 A1 | 3/2011 | Qiang et al. | |
| 2012/0164464 A1 | 6/2012 | Tang et al. | |
| 2013/0281640 A1 | 10/2013 | Tsubuku et al. | |
| 2014/0349089 A1 | 11/2014 | Ueyama et al. | |

OTHER PUBLICATIONS

Chien et al., "Low stress polymer die attach adhesive for plastic packages", Electronic Components and Technology Conference, 1994, Proceedings., 44th, IEEE, May 1-4, 1994, pp. 580-584, Washington, DC.

Alasdair O. Crawford et al., "Examining the thermo-mechanical properties of novel cyanate ester blends through empirical measurement and simulation", journal homepage: www.elsevier.com/locate/react, Reactive & Functional Polymers 72(2012) 596-605.

Henry C. Y. Koh et al."Curing Behavior and Thermal Mechanical Properties of Cyanate Ester Blends", Journal of Applied Polymer Science, vol. 102, 4284-4290 (2006).

G. Voss et al., "Performance Evaluation of Cyanate Ester Resin", (2003), 4 Pages.

Andrew J. Guenthner et al., "New Insights into Structure-Property Relationships in Thermosetting Polymers from Studies of Cocured Polycyanurate Networks", Dec. 23, 2011, 10 Pages.

Andrew J. Guenthner et al., "Synergistic Physical Properties of Cocured Networks Formed from Di- and Tricyanate Esters", Aug. 9, 2013, 12 Pages.

Jer-Yuan Chang et al., "Polar interaction in a cyanated poly(ether sulfone)-modified polycyanurate", Polymer vol. 39 No. 26, pp. 7119-7122, 1998.

Eamor M. Woo et al., "Model with Experimental Evidences for the Morphology of Binary Blends of a Thermosetting Polycyanate with Thermoplastics", Macromolecules 1994, vol. 27, pp. 5291-5296.

Mondragon et al., "Properties and structure of cyanate ester/polysulfone/organoclay nanocomposites", received in revised form Feb. 10, 2006; accepted Mar. 14, 2006, Polymer 47 (2006) 3401-3409.

W.K. Goertzen et al., "Thermal and mechanical evaluation of cyanate ester composites with low-temperature processability", received in revised form Sep. 3, 2006; accepted Sep. 13, 2006, Composites: Part A 38 (2007) pp. 779-784.

Tim J. Wooster et al., "Polymeric Toughening of Particle Filled Cyanate Ester Composites", Accepted: Aug. 22, 2005; DOI: 10.1002/mame.200500178, 9 Pages.

Zhao et al., "Thermal Conductivity Cyanate Ester Resin Composites Filled with Boron Nitride", Advanced Materials and Engineering Materials III, vol. 893, pp. 259-262, Feb. 2014.

Zeng et al., "Thermal behavior and dielectric property analysis of boron nitride-filled bismaleimide-triazine resin composites", Journal of Applied Polymer Science, vol. 128, Issue 3, pp. 1353-1359, May 5, 2013.

Non Final Rejection Issuid in Connection with Related U.S. Appl. No. 14/297,674 dated Oct. 6, 2016.

Final Rejection Issued in Connection with Related U.S. Appl. No. 14/297,674 dated May 5, 2017.

* cited by examiner

CURABLE COMPOSITION FOR ELECTRICAL MACHINE, AND ASSOCIATED METHOD

CROSS REFERENCE TO RELATED APPLICATIONS

This application is a continuation-in-part of U.S. patent application Ser. No. 14/297,674, entitled "Composition for Bonding Winding or Core Laminates in an Electrical Machine, and Associated Method", filed Jun. 6, 2014; which is herein incorporated by reference.

BACKGROUND

The invention generally relates to curable compositions including cyanate ester resins. More particularly, the invention relates to cyanate ester resin compositions for encapsulating components of an electrical machine.

Thermosetting resins are typically used as electrically insulating encapsulating (e.g., potting) materials for electrical machines. Thermosetting resins, such as cyanate ester resins, have desirable mechanical properties, thermal stability, and chemical resistance. However, when used at high temperatures, the performance of some of these materials may be unsatisfactory and may result in significant thermal degradation even after short operating times. The conventional encapsulating materials may further generate cracks and produce excessive heat at the operating temperature of the electrical machines. So, it may be desirable to improve the thermal conductivity as well as the mechanical properties of the cyanate ester resins used for encapsulating materials. Improved materials for dissipating heat generated in electrical machines are also desirable, particularly for generators used in aircraft and other aerospace applications.

Therefore, electrically insulating encapsulating materials that can be used at high temperatures, and are effective in dissipating heat from electrical machines are desirable. Further, improved methods for encapsulating components of an electrical machine are also desired.

BRIEF DESCRIPTION OF THE INVENTION

Embodiments of the present invention are included to meet these and other needs. One embodiment is a curable composition for an electrical machine. The curable composition includes:

(A) about 10 weight percent to about 30 weight percent of a polyfunctional cyanate ester having a structure (I)

(I)

wherein "n" is an integer equal to or greater than 1, Y has a structure (i) or (ii):

 (i)

*Ar²—OCN, (ii)

$Ar^1$ and $Ar^2$ are independently at each occurrence a $C_5$-$C_{30}$ aromatic radical, $R^1$ and $R^2$ are independently at each occurrence a $C_1$-$C_3$ aliphatic radical or a $C_3$-$C_{20}$ cycloaliphatic radical, and * represents the bonding site;

(B) about 25 weight percent to about 60 weight percent of a first difunctional cyanate ester having a structure (II), or a prepolymer thereof NCO—Ar³—R³—Ar³—OCN, (II)

wherein $Ar^a$ is a $C_5$-$C_{30}$ aromatic radical, $R^3$ is a bond or a $C_1$-$C_2$ aliphatic radical;

(C) about 10 weight percent to about 30 weight percent of a second difunctional cyanate ester having a structure (III), or a prepolymer thereof NCO—Ar⁴—R⁵—Ar⁴—OCN, (III)

wherein $Ar^4$ is a $C_5$-$C_{30}$ aromatic radical, and $R^5$ is a $C_3$-$C_{10}$ aliphatic radical; and (D) about 5 weight percent to about 25 weight percent of a thermally conductive filler comprising boron nitride.

One embodiment is a curable composition for encapsulating a component of an electrical machine. The curable composition includes:

(A) about 14 weight percent to about 18 weight percent of a polyfunctional cyanate ester having a structure (I)

(I)

wherein "n" is an integer equal to or greater than 1, Y has a structure (i) or (ii)

 (i)

 (ii)

$Ar^1$ and $Ar^2$ are independently at each occurrence a $C_5$-$C_{30}$ aromatic radical, $R^1$ and $R^2$ are independently at each occurrence a $C_1$-$C_3$ aliphatic radical or a $C_3$-$C_{20}$ cycloaliphatic radical, and * represents the bonding site;

(B) about 32 weight percent to about 40 weight percent of a first difunctional cyanate ester having a structure (II), or a prepolymer thereof NCO—Ar³—R³—Ar³—OCN, (II)

wherein $Ar^3$ is a $C_5$-$C_{30}$ aromatic radical, $R^3$ is a bond or a $C_1$-$C_2$ aliphatic radical;

(C) about 18 weight percent to about 22 weight percent of a second difunctional cyanate ester having a structure (III), or a prepolymer thereof NCO—Ar⁴—R⁵—Ar⁴—OCN, (III)

wherein $Ar^4$ is a $C_5$-$C_{30}$ aromatic radical, and $R^5$ is a $C_3$-$C_{10}$ aliphatic radical;

(D) about 18 weight percent to about 22 weight percent of a thermally conductive filler comprising boron nitride; and (E) about 5 weight percent to about 15 weight percent of a toughener, wherein the toughener comprises a thermoplastic polymer, a reactive cyanate ester, or a combination thereof.

One embodiment is a method of encapsulating a component of an electrical machine, includes: contacting the component with an encapsulating material comprising a curable composition and curing the curable composition, wherein the curable composition comprises:

(A) about 10 weight percent to about 30 weight percent of a polyfunctional cyanate ester having a structure (I)

(I)

wherein "n" is an integer equal to or greater than 1, Y has a structure (i) or (ii)

*$R^2$—$Ar^2$—OCN, or

*$Ar^2$—OCN, $Ar^1$ and $Ar^2$ are independently at each occurrence a $C_5$-$C_{30}$ aromatic radical, $R^1$ and $R^2$ are independently at each occurrence a $C_1$-$C_3$ aliphatic radical or a $C_3$-$C_{20}$ cycloaliphatic radical, and * represents the bonding site;

(B) about 25 weight percent to about 60 weight percent of a first difunctional cyanate ester having a structure (II), or a prepolymer thereof NCO—$Ar^3$—$R^3$—$Ar^3$—OCN,     (II)

wherein $Ar^3$ is a $C_5$-$C_{30}$ aromatic radical, $R^3$ is a bond or a $C_1$-$C_2$ aliphatic radical;

(C) about 10 weight percent to about 30 weight percent of a second difunctional cyanate ester having a structure (III), or a prepolymer thereof NCO—$Ar^4$—$R^5$—$Ar^4$—OCN,     (III)

wherein $Ar^4$ is a $C_5$-$C_{30}$ aromatic radical, and $R^5$ is a $C_3$-$C_{10}$ aliphatic radical; and (D) about 5 weight percent to about 25 weight percent of a thermally conductive filler comprising boron nitride.

DRAWINGS

These and other features, aspects, and advantages of the present invention will become better understood when the following detailed description is read with reference to the accompanying drawings, wherein.

DETAILED DESCRIPTION

Figure 1:
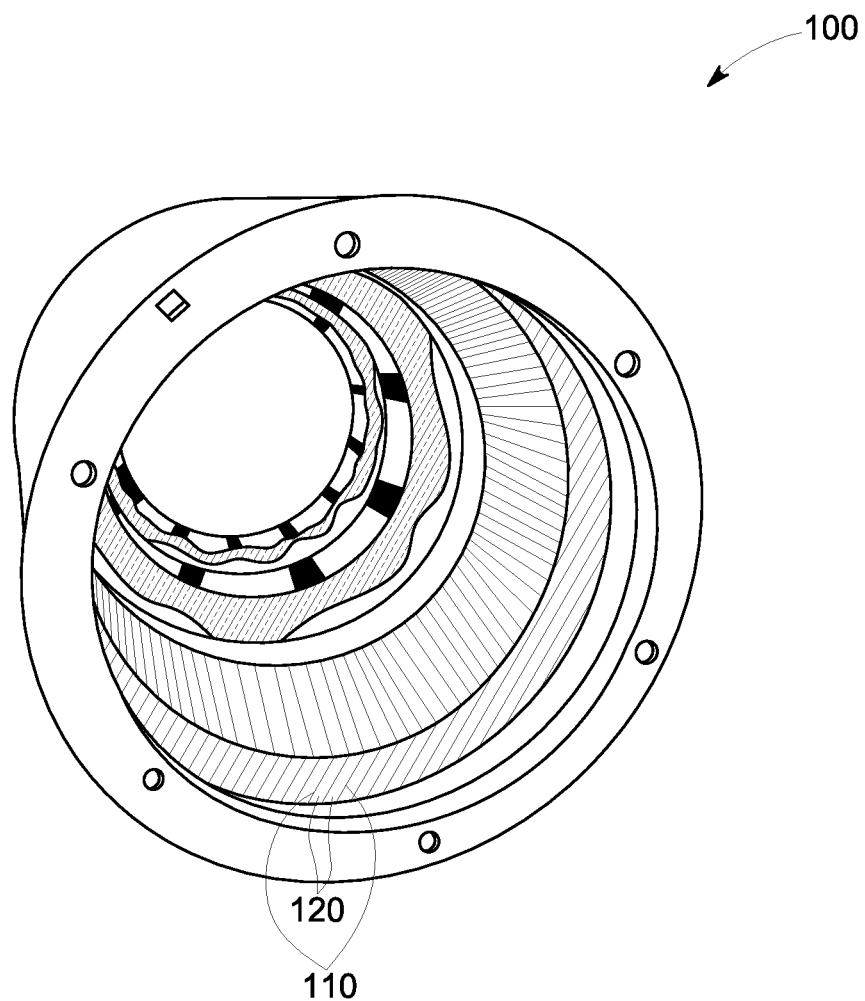
FIG. 1 shows a stator including the curable composition, in accordance with some embodiments of the invention.

As discussed in detail below, some of the embodiments of the invention relate to compositions for encapsulating components or bonding of windings in an electrical machine. More particularly, the invention relates to cyanate ester resin compositions for encapsulating components in an electrical machine.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical, which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. Aromatic radicals include halogenated aromatic radicals such as 4-trifluoromethylphenyl, hexafluoroisoprop ylidenebis (4-phen-1-yloxy) (i.e., —OPhC$(CF_3)_2$PhO—), 4-chloromethylphen-1-yl, 3-trifluorovinyl-2-thienyl, 3-trichloromethylphen-1-yl (i.e., 3-Cl$_3$Ph-), 4-(3-bromoprop-1-yl)phen-1-yl (i.e., 4-BrCH$_2$CH$_2$CH$_2$Ph-), and the like. Further examples of aromatic radicals include 4-allyloxyphen-1-oxy, 4-aminophen-1-yl (i.e., 4-H$_2$NPh-), 3-aminocarbonylphen-1-yl (i.e., NH$_2$COPh-), 4-benzoylphen-1-yl, dicyanomethylidenebis(4-phen-1-yloxy) (i.e., —OPhC(CN)$_2$PhO—), 3-methylphen-1-yl, methylenebis(4-phen-1-yloxy) (i.e., —OPhCH$_2$PhO—), 2-ethylphen-1-yl, phenylethenyl, 3-formyl-2-thienyl, 2-hexyl-5-furanyl, hexamethylene-1,6-bis(4-phen-1-yloxy) (i.e., —OPh(CH$_2$)$_6$PhO—), 4-hydroxymethylphen-1-yl (i.e., 4-HOCH$_2$Ph-), 4-mercaptomethylphen-1-yl (i.e., 4-HSCH$_2$Ph-), 4-methylthiophen-1-yl (i.e., 4-CH$_3$SPh-), 3-methoxyphen-1-yl, 2-methoxycarbonylphen-1-yloxy (e.g., methyl salicyl), 2-nitromethylphen-1-yl (i.e., 2-NO$_2$CH$_2$Ph), 3-trimethylsilylphen-1-yl, 4-t-butyldimethylsilylphenl-1-yl, 4-vinylphen-1-yl, vinylidenebis(phenyl), and the like. The term "a $C_3$-$C_{10}$ aromatic radical" includes aromatic radicals containing at least three but no more than 10 carbon atoms. The aromatic radical 1-imidazolyl ($C_3H_2N_2$—) represents a $C_3$ aromatic radical. The benzyl radical ($C_7H_7$—) represents a $C_7$ aromatic radical.

As used herein, the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group ($C_6H_{11}CH_2$—) is a cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a $C_6$ cycloaliphatic radical comprising a methyl group, the methyl group being a functional group which is an alkyl group. Similarly, the 2-nitrocyclobut-1-yl radical is a $C_4$ cycloaliphatic radical comprising a nitro group, the nitro group being a functional group. A cycloaliphatic radical may comprise one or more halogen atoms, which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis(cyclohex-4-yl) (i.e., $-C_6H_{10}C(CF_3)_2C_6H_{10}-$), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g., $CH_3CHBrCH_2C_6H_{10}O-$), and the like. Further examples of cycloaliphatic radicals include 4-allyloxycyclohex-1-yl, 4-aminocyclohex-1-yl (i.e., $H_2NC_6H_{10}-$), 4-aminocarbonylcyclopent-1-yl (i.e., $NH_2COC_5H_8-$), 4-acetyloxycyclohex-1-yl, 2,2-dicyanoisopropylidenebis(cyclohex-4-yloxy) (i.e., $-OC_6H_{10}C(CN)_2C_6H_{10}O-$), 3-methylcyclohex-1-yl, methylenebis(cyclohex-4-yloxy) (i.e., $-OC_6H_{10}CH_2C_6H_{10}O-$), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., $-OC_6H_{10}(CH_2)_6C_6H_{10}O-$), 4-hydroxymethylcyclohex-1-yl (i.e., 4-$HOCH_2C_6H_{10}-$), 4-mereaptomethylcyclohex-1-yl (i.e., 4-$HSCH_2C_6H_{10}-$), 4-methylthiocyclohex-1-yl (i.e., 4-$CH_3SC_6H_{10}-$), 4-methoxycyclohex-1-yl, 2-methoxycarbonylcyclohex-1-yloxy(2-$CH_3OCOC_6H_{10}O-$), 4-nitromethylcyclohex-1-yl (i.e., $NO_2CH_2C_6H_{10}-$), 3-trimethylsilylcyclohex-1-yl, 2-t-butyldimethylsilylcyclopent-1-yl, 4-trimethoxysilylethylcyclohex-1-yl (e.g., $(CH_3O)_3SiCH_2CH_2C_6H_{10}-$), 4-vinylcyclohexen-1-yl, vinylidenebis(cyclohexyl), and the like. The term "a $C_3$-$C_{10}$ cycloaliphatic radical" includes cycloaliphatic radicals containing at least three but no more than 10 carbon atoms. The cycloaliphatic radical 2-tetrahydrofuranyl ($C_4H_7O-$) represents a $C_4$ cycloaliphatic radical. The cyclohexylmethyl radical ($C_6H_{11}CH_2-$) represents a $C_7$ cycloaliphatic radical.

As used herein, the term "aliphatic radical" refers to an organic radical having a valence of at least one consisting of a linear or branched array of atoms which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a $C_6$ aliphatic radical comprising a methyl group, the methyl group being a functional group which is an alkyl group. Similarly, the 4-nitrobut-1-yl group is a $C_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., $-CH_2CHBrCH_2-$), and the like. Further examples of aliphatic radicals include allyl, aminocarbonyl (i.e., $CONH_2$), carbonyl, 2,2-dicyanoisopropylidene (i.e., $-CH_2C(CN)_2CH_2-$), methyl (i.e., $-CH_3$), methylene (i.e., $-CH_2-$), ethyl, ethylene, formyl (i.e., $-CHO$), hexyl, hexamethylene, hydroxymethyl (i.e., $-CH_2OH$), mercaptomethyl (i.e., $-CH_2SH$), methylthio (i.e., $-SCH_3$), methylthiomethyl (i.e., $-CH_2SCH_3$), methoxy, methoxycarbonyl (i.e., $CH_3OCO-$), nitromethyl (i.e., $-CH_2NO_2$), thiocarbonyl, trimethylsilyl (i.e., $(CH_3)_3Si-$), t-butyldimethylsilyl, 3-trimethyoxysilylpropyl (i.e., $(CH_3O)_3SiCH_2CH_2CH_2-$), vinyl, vinylidene, and the like. By way of further example, a $C_1$-$C_{10}$ aliphatic radical contains at least one but no more than 10 carbon atoms. A methyl group (i.e., $CH_3-$) is an example of a $C_1$ aliphatic radical. A decyl group (i.e., $CH_3(CH_2)_9-$) is an example of a $C_{10}$ aliphatic radical.

As discussed in detail below, some embodiments of the invention are directed to a curable composition for an electrical machine. The curable composition includes:

(A) about 10 weight percent to about 30 weight percent of a polyfunctional cyanate ester having a structure (I)

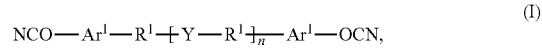

$$NCO-Ar^1-R^1+Y-R^1+_n-Ar^1-OCN, \quad (I)$$

wherein "n" is an integer equal to or greater than 1, Y has a structure (i) or (ii)

$$*R^2-Ar^2-OCN, \text{ or} \quad (i)$$

$$*Ar^2-OCN, \quad (ii)$$

$Ar^1$ and $Ar^2$ are independently at each occurrence a $C_5$-$C_{30}$ aromatic radical, $R^1$ and $R^2$ are independently at each occurrence a $C_1$-$C_3$ aliphatic radical or a $C_3$-$C_{20}$ cycloaliphatic radical, and * represents the bonding site;

(B) about 25 weight percent to about 60 weight percent of a first difunctional cyanate ester having a structure (II), or a prepolymer thereof $$NCO-Ar^3-R^3-Ar^3-OCN, \quad (II)$$

wherein $Ar^3$ is a $C_5$-$C_{30}$ aromatic radical, $R^3$ is a bond or a $C_1$-$C_2$ aliphatic radical;

(C) about 10 weight percent to about 30 weight percent of a second difunctional cyanate ester having a structure (III), or a prepolymer thereof $$NCO-Ar^4-R^5-Ar^4-OCN, \quad (III)$$

wherein $Ar^4$ is a $C_5$-$C_{30}$ aromatic radical, and $R^5$ is a $C_3$-$C_{10}$ aliphatic radical; and (D) about 5 weight percent to about 25 weight percent of a thermally conductive filler comprising boron nitride.

The term "polyfunctional cyanate ester" as used herein, refers to a material including three or more cyanate ester functional groups. The term "difunctional cyanate ester" as used herein refers to a material including two cyanate ester functional groups.

Non-limiting examples of suitable polyfunctional cyanate esters include phenolic novolac cyanate ester, dicylopentadiene novolac cyanate ester, 1,2,3-tris(4-cyanatophenyl)-propane, or combinations thereof. In certain embodiments, the polyfunctional cyanate ester includes a structure having formulae (VII) or (VIII):

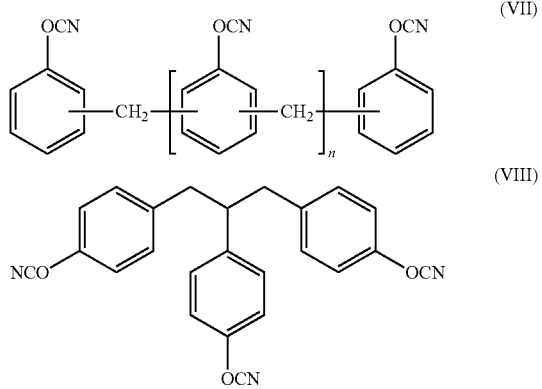

Non-limiting examples of a suitable polyfunctional cyanate ester include Primaset™ PT30, Primaset™ PT15, or combinations thereof, commercially available from Lonza.

In some embodiments, the amount of polyfunctional cyanate ester in the curable composition is in a range from about 10 weight percent to about 30 weight percent. In certain embodiments, the amount of polyfunctional cyanate ester in the curable composition is in a range from about 12 weight percent to about 22 weight percent. In certain embodiments, the amount of polyfunctional cyanate ester in the curable composition is in a range from about 14 weight percent to about 18 weight percent.

In some embodiments, the first difunctional cyanate ester includes a structure having a formula (IV):

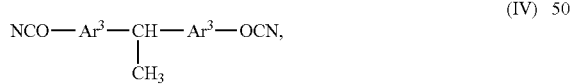

wherein $Ar^3$ is a $C_5$-$C_{30}$ aromatic radical. In certain embodiments, the first difunctional ester includes a structure having a formula (IX):

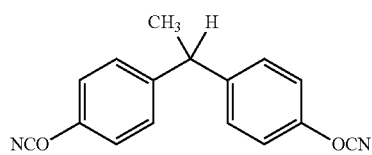

Non-limiting example of a suitable first difunctional cyante ester includes Primaset™ LECY, commercially available from Lonza.

The amount of the first difunctional cyanate ester in the curable composition may be in a range from about 25 weight percent to about 60 weight percent. In some embodiments, the amount of the first difunctional cyanate ester in the curable composition is in a range from about 30 weight percent to about 50 weight percent. In certain embodiments, the amount of the first difunctional cyanate ester in the curable composition is in a range from about 32 weight percent to about 40 weight percent.

In some embodiments, the second difunctional cyanate ester includes a prepolymer of a difunctional cyanate ester having a formula (V):

$$NCO-Ar^4-R^4-Ar^4-OCN. \quad (V)$$

wherein $Ar^4$ is a $C_5$-$C_{30}$ aromatic radical, and $R^4$ is $C_3$-$C_{20}$ aliphatic radical. The term "prepolymer" as used herein refers to a monomer or a plurality of monomers that have been reacted to an intermediate molecular weight state. This material is capable of further polymerization by reactive groups to a high molecular weight state. As such, mixtures of reactive polymers with un-reacted monomers may also be referred to as pre-polymers. The term "prepolymer" and "polymer precursor" are sometimes used interchangeably.

In some embodiments, the second difunctional cyanate ester includes a prepolymer of a difunctional cyanate ester having a formula (VI):

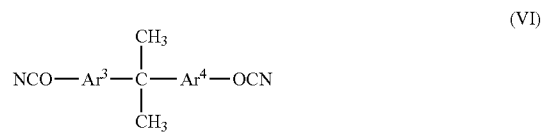

wherein $Ar^4$ is a $C_5$-$C_{30}$ aromatic radical.

In some embodiments, the second difunctional cyanate ester includes a prepolymer of a difunctional cyanate ester having a formula (X):

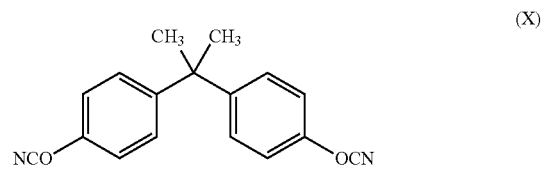

Non-limiting example of a suitable second difunctional cyanate ester includes Primaset™ BA3000, commercially available from Lonza.

In some embodiments, the amount of second difunctional cyanate ester in the curable composition is in a range from about 10 weight percent to about 30 weight percent. Further, the amount of second difunctional cyanate ester in the curable composition may be in a range from about 15 weight percent to about 25 weight percent. In certain embodiments, the amount of second difunctional cyanate ester in the curable composition is in a range from about 18 weight percent to about 22 weight percent.

The curable composition further includes a thermally conductive filler. The thermally conducting filler includes boron nitride. In some embodiments, the thermally conductive filler is added at various loading levels depending on several requirements of the cured composition (such as thermal conductivity, viscosity or toughness).

In some embodiments, the thermally conductive filler is present in the curable composition in an amount in a range from about 5 weight percent to about 25 weight percent. In some embodiments, the thermally conductive filler is present in an amount in a range from about 15 weight percent to about 25 weight percent. In certain embodiments, the amount of the thermally conductive filler in the curable composition is in a range from about 18 weight percent to about 22 weight percent.

The curable composition may further comprise a toughener, wherein the toughener includes a reactive cyanate ester, a thermoplastic polymer, or a combination thereof. The toughener may be present in an amount in a range from about 5 weight percent to about 15 weight percent. The term "reactive cyanate ester" as used herein refers to a material including cyanate ester moieties, that is capable of reacting with one or more of the polyfunctional cyanate ester, the first difunctional cyanate ester, and the second difunctional cyanate ester. Non-limiting example of a suitable reactive cyanate ester includes Primaset™ HTL 300, commercially available from Lonza.

In some embodiments, the thermoplastic polymer includes a polyimide. In certain embodiments, the polyimide includes structural units having a formula (XI):

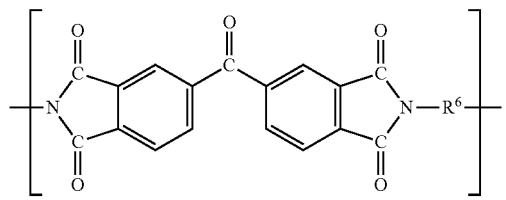

wherein $R^6$ is a $C_3$-$C_{10}$ aliphatic radical, a $C_5$-$C_{30}$ aromatic radical, or combinations thereof. Non-limiting example of a suitable polyimide includes P84™, commercially available from Evonik.

The cross-linking reaction of the cyanate ester resins at elevated temperatures may be controlled by selection of appropriate catalysts. In some embodiments, the curable composition may further include a suitable catalyst. Without being bound by any theory it is believed that in the absence of a sufficient amount of catalyst, the curable composition may react quickly on heating to high temperatures, and the corresponding reaction rate may be higher than the heat dissipation rate resulting in local hot spots and thermal runaway. In some embodiments, the reaction temperature may be reduced and the reaction rate may be controlled by choosing the appropriate catalyst chemistry and by controlling the amount of catalyst used.

Non-limiting examples of suitable catalysts include transition metal carboxylates or chelates. In some embodiments, non-limiting examples of suitable catalyst include acetylacetonates of zinc, copper, cobalt, manganese, iron, aluminum, or combinations of thereof. In certain embodiments, the catalyst includes copper acetylacetonate, cobalt acetylacetonate, aluminum acetylacetonate or combinations thereof. In some embodiments, co-catalysts that provide an active hydrogen source (for example, alkylphenols) may also be used. In some embodiments, the catalyst may be present in the curable composition in a range from about 25 parts per million (ppm) to about 150 ppm.

In some embodiments, the curable composition may further include additional additives, such as, stabilizing agents, additional toughening agents and the like.

The curable composition may be cured using any suitable method. In some embodiments, the curable composition may be cured by heating the composition. In some embodiments, a temperature in a range from about 18° C. to about 400° C. may be used for curing. In certain embodiments, a temperature in a range from about 100° C. to about 300° C. may be used for curing. The time required for curing may differ depending on the end application, for example, it may depend upon the thickness of the molded article or laminate. In some embodiments, a time period sufficient for curing the composition may be in a range of from about 2 hour to about 12 hours. In embodiments wherein the cured composition is used as molded articles (such as those produced via resin transfer molding, compression molding, or injection molding), laminates, bonded articles, or as encapsulating materials, it may be desirable to apply pressure during the heat curing step. In some other embodiments, microwave, radio frequency, ionizing radiation, electron beams, or combinations thereof may be used to effect the curing step.

Without being bound by any theory, it is believed that the polyfunctional cyanate ester after cross-linking provides the desired thermal stability and thermal properties. By blending the first difunctional cyanate ester with the polyfunctional cyanate ester, a thermally stable resin may be achieved, wherein the resin has a glass transition temperature above 280° C. Further, the first difunctional cyanate ester when blended with the polyfunctional cyanate ester provides the desired viscosity for processing. However, the cured composition formed after cross-linking of the polyfunctional cyanate ester and the first difunctional cyanate ester is typically rigid, and may be susceptible to crack formations during thermal cycling. Toughening materials, such as, the second difunctional cyanate ester are added to improve the mechanical properties of the composition, while maintaining the viscosity of the curable composition and desired thermal stability. The toughening material may react with the cyanate resins and form a homogeneous cross-linked structure with longer chains, to provide heat resistance and thermal stability. In some embodiments, as mentioned earlier, additional tougheners may be further added to the composition to improve the toughness, wherein the toughener includes a reactive cyanate ester, a thermoplastic polymer, or a combination thereof.

Thermal conductivity of the cured composition may further be increased to provide a high temperature, thermally conductive, and mechanically tough encapsulation (e.g., potting) composition for electric machines. In some embodiments, boron nitride is added to increase thermal conductivity of the cured composition. Without being bound by any theory, it is believed that although boron nitride filler increases the thermal conductivity of the cured composition, the toughness of the resulting composition may be reduced in some instances. In some such instances, to improve the cured composition toughness, an additional toughener (e.g., a reactive cyanate ester or a thermoplastic polymer) may be added. The additional toughener may improve the fracture resistance. In some embodiments of the present invention, for preparing a cured composition with the desired properties, five primary materials may be blended, which include a polyfunctional cyanate ester, a first difunctional cyanate ester, a second difunctional cyanate ester, a thermally conductive filler (such as boron nitride) and a toughening material (such as thermoplastic polymer or a reactive cyanate ester).

Without being bound by any theory, it is believed that by controlling the relative amounts of polyfunctional cyanate ester, the first difunctional cyanate ester, the second difunctional cyanate ester, a thermally conductive filler (such as boron nitride), and a toughening material (such as thermoplastic polymer or a reactive cyanate ester), the desired combination of properties (such as, thermal stability, thermal conductivity, flexural strength, fracture toughness, and viscosity) may be achieved. For example, as described earlier, a certain minimum amount of the polyfunctional cyanate ester is desired to achieve the desired thermal stability. Similarly, the amount of the first difunctional cyanate ester may be controlled in the curable composition such that the curable composition has viscosity sufficiently low for processing. In some embodiments, the curable composition may be substantially solvent-free and the first difunctional cyanate ester may provide the desired viscosity characteristics. Further, the amount of the second difunctional cyanate ester may be controlled in the curable composition to provide the desired mechanical properties in the cured composition. As noted earlier, an appropriate amount of thermally conductive filler may be added to further increase the thermal conductivity of the composition. However, the addition of boron nitride may decrease the toughness of the composition, which may be regained by addition of a controlled amount of a toughening material, such as, a thermoplastic polymer or a reactive cyanate ester.

In some embodiments, the curable composition has a viscosity, and the related cured composition has thermal and mechanical properties suitable for the end-use application (for example, potting material for a generator stator). The term "cured composition" as used herein includes both partially and completely cured compositions.

In some embodiments, the curable composition has a viscosity less than about 5000 centiPoise (cP) at a temperature of about 100° C. In some embodiments, the curable composition has a viscosity less than about 4000 centiPoise (cP) at a temperature of about 100° C. In some embodiments, the curable composition has a viscosity less than about 3000 centiPoise (cP) at a temperature of about 100° C.

To facilitate improvement in thermal stability, it is desirable that the cured composition has a glass transition temperature at least about 280° C., in some embodiments. In some embodiments, the cured composition of the curable composition has a glass transition temperature of at least about 300° C.

As noted, thermally conductive filler material (such as boron nitride) is added to increase the thermal conductivity of the cured composition. In some embodiments, the cured composition has a thermal conductivity in a range from about 0.75 W/m·K to about 1.2 W/m·K. In some other embodiments, the cured composition has a thermal conductivity greater than 1.0 W/m·K.

The cured composition after thermal cycling may also be characterized by a flexural strength and fracture toughness. In some embodiments, the cured composition has a flexural strength greater than 8000 psi. In some embodiments, the cured composition has a flexural strength in a range from about 8500 psi to about 11000 psi. In some embodiments, the cured composition has a fracture toughness in a range from about 1.2 MPa·m$^{1/2}$ to about 1.6 MPa·m$^{1/2}$.

Non-limiting examples of suitable applications for the curable composition include encapsulation, bonding, insulation, lamination, or combinations thereof. In some embodiments, the curable composition may be used for encapsulating components of an electrical machine. Non-limiting examples of suitable components include stators, windings, core-laminates, slot liners, slot wedges, or combinations thereof. The electrical machine may be selected from the group consisting of a motor, a generator, a transformer, a toroid, an inductor, and combinations thereof. In some embodiments, a stator of a generator includes the cured composition of the curable composition. FIG. 1 illustrates a schematic of a stator 100 impregnated with the curable composition 120. As illustrated in FIG. 1, the curable composition 120 and the resulting cured composition may fill all the gaps and spaces present between the stator windings 110.

In some embodiments, an electrically insulating encapsulating material including a cured composition of the curable composition is also presented. The encapsulating material in some instances may provide: (1) desired heat stability at a temperature greater than 250° C. by using the polyfunctional cyanate ester and a thermally conductive filler (boron nitride); and (2) processability for the impregnation process by using the first difunctional cyanate ester to maintain viscosity, and by appropriate catalyst selection to minimize exothermic heat resulting in thermal run ways.

Further, in some embodiments, the encapsulating material may be thermally stable and may be effective at dissipating heat from the electrical machines operating at high temperatures. The high temperature stability and heat dissipation property may be useful, for example, in generator applications. The generator requires heat reduction while maximizing the output; specifically when used in aircraft and other aerospace applications. The encapsulating material may also be suitable for usage in motors and transformers. In some such instances, the encapsulating material may provide the desired resistance to shock and vibration, and exclusion of moisture and corrosive agents under high speed vibration.

A method of encapsulating a component of an electrical machine is also presented. The method includes contacting the component with an encapsulating material including a curable composition as described earlier. The term "contacting" as used herein refers to impregnating one or more components of the electrical machine with the curable composition using a suitable technique, for example, pressure impregnation or vacuum impregnation. For example, in some embodiments, the method may include placing a stator in a mold. An encapsulating composition may be impregnated into the cavity of the stator by applying pressure such that the encapsulating composition fills all the spaces and gaps present within the stator components (such as gaps between stator windings). The method further includes heating the component to cure the curable composition in the presence or absence of a vacuum.

One example of such a method is the vacuum pressure impregnation method, in which an entire component of an electrical machine assembly is placed in a pressure vessel under a high vacuum that draws out entrapped air and other gases. The curable composition is introduced to the pressure vessel and the entire tank is pressurized, typically to at least 90 psi or higher to achieve a total penetration of the machine components. The assembly may be baked at elevated temperatures to cure the curable composition. In some embodiments, the curable composition is cured at a temperature in a range from about 120° C. to about 250° C.

EXAMPLES

Materials: BA3000, PT-30, LECY, and Primaset HTL-300 were obtained from Lonza. P84 NT2 polyimide was obtained from Evonik, and PTX60P boron nitride was obtained from Momentive. All mixing of resins were done in plastic cups (resin cup) designed for use in high speed planetary centrifugal mixer equipped with vacuum. The boron nitride filler and thermoplastic tougheners were dried in vacuum oven at 150° C. for at least 24 hours, and removed from oven prior to additions.

Method for Preparing Catalyst Solution:

Copper (II) acetylacetonate solution was prepared by adding 0.300 g of Cu(acac)$_2$ to 10.0 g of nonylphenol. The resulting copper (II) acetylacetonate solution was added to an oversized vial and sonicated at 50° C. for 60 minutes.

Curing Process in Detail:

Curing schedule: A variety of formulations contained in various molds and metallic pans were cured in programmable oven according to the following protocol:

1) Heat from room temperature to 120° C. and hold at 120° C. for 3 hours.
2) Heat to 165° C. and hold for 2 hours
3) Heat to 250° C. and hold for 4-6 hours In an alternate process, the first step was skipped, and the sample was heated directly to 150° C. to 165° C., in order to fully gel the material and effect most of the polymerization before final cure at high temperature.

The following ASTM methods were used for determining: 1) Flexural Strength (D790); 2) Flexural Strain (D790); 3) Fracture Toughness (D5045); 4) glass transition temperature or $T_g$ by DMA (E1640); and 5) thermal conductivity (E1540) measured at 250° C.

Viscosity Measurements were Performed as Follows:

The viscosity of the resin formulation was tested using a Brookfield DV-II+ programmable viscometer with Thermosel temperature controller. A disposable sample chamber (model #HT-2DB) was charged with 17.5 grams (+/−0.5 grams) of pre-warmed resin formulation (50° C.) that was gently mixed after warming to insure homogeneity. A $SC_4$ series Thermoset spindle was placed inside the sample chamber that was already inserted into the Thermosel temperature controller. Viscosity was measured at a spin rate of 6 rpm's and temperature of 100° C. After 15 minutes of equilibration under these conditions, the viscosity was recorded.

Example 1 Blends of PT30, LECY, BA3000, and Boron Nitride (BN)

BA3000 was placed in a 75° C. oven for approximately 1 hour in order to facilitate transfer to a resin cup. The resin cup was charged with BA3000, LECY and PT-30 and heated for about 15-30 minutes in oven. The components were then mixed for 4 minutes, followed by hand mixing to ensure any undissolved BA3000 was distributed throughout the cup, and further mixed for 4 minutes. After cooling the resin mixture on bench for 15-20 minutes, copper acetylacetonate in nonylphenol (50 ppm of copper acetylacetonate relative to resins) was added to the resin mixture and mixed for an additional 30 seconds. The dry boron nitride was added to the above mixture of resin and catalyst and mixed for 30 seconds. The mixing was continued for additional 3.5 minutes under vacuum to complete mixing, and the homogeneous mixture was degassed Immediately after mixing, samples for thermal conductivity and mechanical testing were prepared by pouring the mixture into molds and/or simple disposable pans that had been pretreated with Frekote. The remaining resin was stored at 4° C. prior to viscosity measurements and as reserve for any additional tests. Table 1 lists the different blend samples and their compositions. In Table 1, sample no. 1 is the comparative example without PT30 or any toughener. Table 2 shows the data for samples 2-12 (blends with BN filler) versus the comparative sample 1 (blend without BN filler).

TABLE 1

Compositions of different blends

| Sample No. | BA 3000 Wt % | LECY Wt % | PT 30 Wt % | BN Wt % | P84 Wt % |
|---|---|---|---|---|---|
| 1 | 38.7 | 38.7 | — | 22.5 | — |
| 2 | 19.4 | 38.7 | 19.4 | 22.5 | — |
| 3 | 31.0 | 31.0 | 15.5 | 22.5 | — |
| 4 | 19.4 | 38.7 | 15.5 | 22.5 | 3.9 |
| 5 | 19.4 | 34.8 | 15.5 | 22.5 | 7.7 |
| 6 | 20.6 | 41.2 | 20.6 | 17.5 | — |
| 7 | 20.6 | 37.1 | 16.5 | 17.5 | 8.2 |
| 8 | 20.6 | 41.2 | 20.6 | 17.5 | — |
| 9 | 20.0 | 36.0 | 16.0 | 20.0 | 8.0 |
| 10 | 20.0 | 39.9 | 20.0 | 20.0 | — |
| 11 | 21.8 | 39.3 | 17.5 | 12.5 | 8.7 |
| 12 | 21.2 | 38.2 | 17.0 | 15.0 | 8.5 |

TABLE 2

Properties of different blends

| Sample No. | Viscosity cp@100 | Tg (° C.) | Flexural strength (psi) | Strain | FT (Mps · m$^{1/2}$) | TC (W/m · K) |
|---|---|---|---|---|---|---|
| 1 | — | 292 | | | | |
| 2 | 1625 | 312 | 8542 | 1.6 | 1.241 | 1.08 |
| 3 | — | 308 | 8699 | 1.61 | 1.287 | |
| 4 | — | — | 8594 | 1.65 | 1.349 | |
| 5 | 5000 | — | 9412 | 1.83 | 1.483 | |
| 6 | 2150 | — | 8940 | 1.83 | 1.23 | |
| 7 | 1200 | — | 9563 | 1.99 | 1.266 | 0.7 |
| 8 | 600 | — | 9300 | 2.05 | 1.074 | 0.56 |
| 9 | 2400 | 311 | 9697 | 2.25 | 1.433 | 0.82 |
| 10 | 1100 | 314 | 9110 | 1.90 | 1.234 | 0.77 |
| 11 | 450 | — | — | — | — | 0.55 |
| 12 | 700 | — | — | — | — | 0.62 |

Example 3 Blends of PT30, LECY, BA3000, Boron Nitride, and Thermoplastic Polyimide (P84)

BA3000 was placed in a 75° C. oven for approximately 1 hour in order to facilitate transfer to a resin cup. The resin cup was charged with of BA3000, LECY and PT-30 and heated for 15-30 minutes in oven. These components were then mixed for 4 minutes, followed by hand mixing to ensure any undissolved BA3000 was distributed throughout the cup, and further mixed for 4 minutes. The P-84 thermoplastic was then added to the above resin-mixture and mixed for 30 seconds. After cooling, the resin-mixture and the toughener P-84 on bench for 15-20 minutes, copper acetylacetonate in nonylphenol (50 ppm of copper acetylacetonate relative to reactive resins) was added and mixed for an additional 30 seconds. The dry boron nitride was added to the mixture and mixed for 30 seconds. The mixing was continued for additional 3.5 minutes under vacuum to complete mixing, and the homogeneous mixture was degassed Immediately after mixing, samples for thermal conductivity and mechanical testing were prepared by pouring the mixture into molds and/or simple disposable pans that had been pretreated with Frekote. The remaining resin was stored at 4° C. prior to viscosity measurements and as reserve for any additional tests. Table 1 lists the different blend samples and their compositions. Table 2 shows the data for samples 4, 5, 7, 9, 11, and 12 (blends with P84 formulations) versus the comparative samples 2, 3, 6, 8, and 10 (blends which are devoid of P84 toughener).

Figure 2:
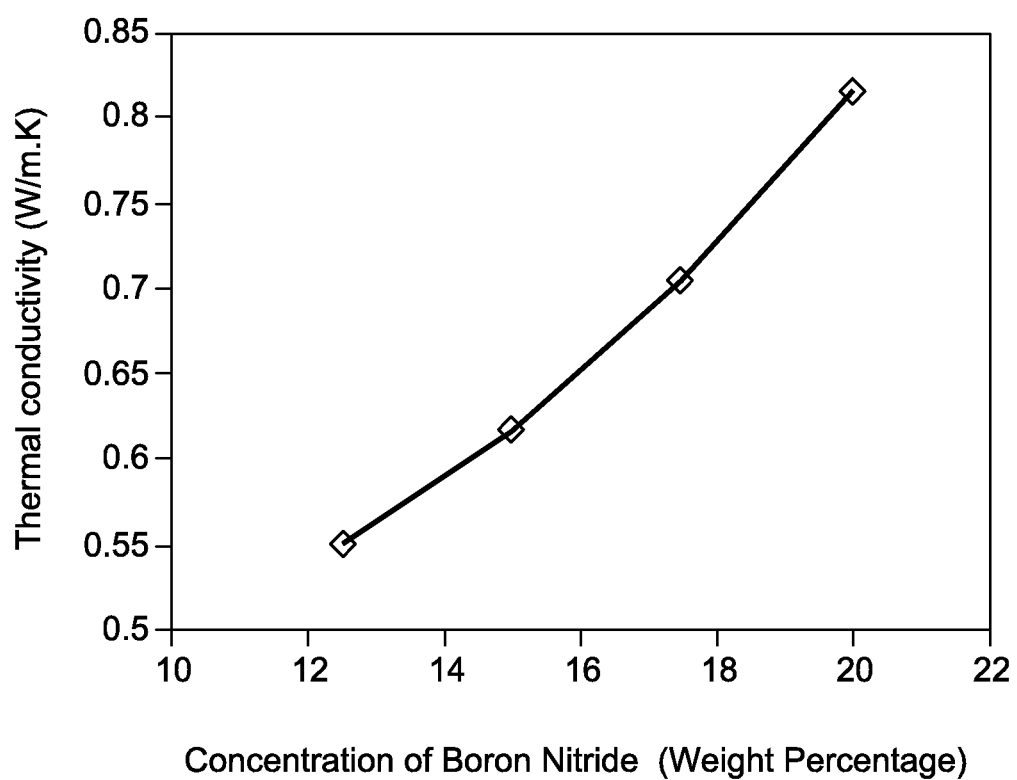
FIG. 2 is a graph illustrating change in thermal conductivity with increasing concentration of boron nitride, in accordance with some embodiments of the invention.

Different blends including PT30, LECY, BA3000, P84, with varying concentration of BN were compared in Table 2. In Table 1, samples 11, 12, 7 and 9 show low to high concentration (such as 12.5, 15, 17.5 and 20 wt %) of BN in the blend with approximately same amount of P84 toughener. As the BN concentration increases from 12.5 to 20 wt %, the concentration of other components including P84 was reduced proportionately. The thermal conductivity (0.55, 0.62, 0.7, 0.82) and viscosity (450, 700, 1200, 2400 cP at 100° C.) of the blend increased with increased concentration of BN. The data is also presented in FIG. 2, which shows improved thermal conductivity of the blend with increased concentration of boron nitride.

Use of toughener, such as thermoplastic polyimide in the blend (e.g., blend of PT30, LECY, BA3000, BN and P84-samples 4, 5, 7, 9, 11 and 12) increased the toughening property compared to the blend without a toughener (e.g., a blend of PT30, LECY, BA3000, and BN-samples 2, 3, 6, 8, and 10). A comparison of samples showed that the toughener P84 increased the mechanical strength of the material; especially the fracture toughness (FT) (Table 2). The fracture toughness increased from 1.07 (sample no. 8) to 1.27 Mps·m$^{1/2}$ (sample no. 7) at 17.5 wt % BN, and by increasing the concentration of P84 of the samples from 0 to 8.2 wt %. Similarly the fracture toughness (FT) increased from 1.23 (sample no. 10) to 1.43 (sample no. 9) Mps·m$^{1/2}$ for 20 wt % BN, by increasing the concentration of P84 of the samples from 0 to 8.0 wt %.

Example 4 Blends of PT30, LECY, BA3000, BN and Primaset HTL-300

BA3000 was placed in 75° C. oven for approximately 1 hour in order to facilitate transfer of the sample to a resin cup. The resin cup was charged with BA3000, LECY, of PT-30 and HTL-300 (15 wt %) and heated for 15-30 minutes in oven. The components were then mixed for 4 minutes, followed by hand mixing to ensure any undissolved BA3000 was distributed throughout the cup, and further mixed for 4 minutes. After cooling on the bench for 15-20 minutes, copper acetylacetonate in nonylphenol (50 ppm of copper acetylacetonate relative to reactive resins) was added and mixed for an additional 30 seconds. The dry boron nitride was added and mixed for 30 seconds. Vacuum was then applied to the mixer; mixing continued for additional 3.5 minutes to complete mixing and the homogeneous mixture was degassed Immediately after mixing, samples for thermal conductivity and mechanical testing were prepared by pouring into molds and/or simple disposable pans that had been pretreated with Frekote. The remaining resin was stored at 4° C. prior to viscosity measurements and as reserve for any additional tests.

The result of mechanical testing for blends with HTL-300 is presented in Table 3. Viscosity increased (from 1900 cP to 6500 cP at 100° C.) for the formulations of HTL-300 as shown in Table 3, such as for sample no.s 13, 14, 15, 18, 16, and 17. Viscosity increased substantially when the levels of HTL-300 were high enough to improve the various mechanical properties. Therefore, HTL-300 based blend may be used in applications where low viscosity values are not essential.

TABLE 3

Various properties of a blend with HTL-300

| Sample No. | BA 3000 | LECY | PT 30 | BN Wt % | HTL-300 | Viscosity cp@100 | Tg (° C.) | Flexural strength | Strain | FT (Mps · m$^{1/2}$) |
|---|---|---|---|---|---|---|---|---|---|---|
| 13 | 19.4 | 38.7 | 15.5 | 22.5 | 3.9 | 1900 | 314 | 8350 | 1.55 | |
| 14 | 19.4 | 34.8 | 15.5 | 22.5 | 7.7 | 2300 | 318 | 7718 | 1.65 | 1.272 |
| 15 | 19.4 | 31.0 | 15.5 | 22.5 | 11.6 | 2500 | 318 | 8028 | 1.85 | 1.305 |
| 16 | 19.4 | 27.1 | 15.5 | 22.5 | 15.5 | 4300 | — | 8597 | 1.82 | 1.299 |
| 17 | 19.4 | 23.2 | 15.5 | 22.5 | 19.4 | 6500 | — | 7905 | 1.62 | 1.319 |
| 18 | 19.4 | 31.0 | 15.5 | 22.5 | 11.6 | 2400 | — | 9033 | 1.94 | 1.198 |

The appended claims are intended to claim the invention as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:

1. An electrical machine comprising an electrically insulating encapsulating material, wherein the electrically insulating encapsulating material comprises a cured composition of a curable composition, the curable composition comprising:

(A) about 10 weight percent to about 30 weight percent of a polyfunctional cyanate ester having a structure (I)

$$NCO-Ar^1-R^1-\!\!\left[\!Y-R^1\right]_{\!\!n}\!\!-Ar^1-OCN, \qquad (I)$$

wherein "n" is an integer equal to or greater than 1, Y has a structure (i) or (ii):

*$R^2$—$Ar^2$—OCN, or  (i)

*$Ar^2$—OCN,  (ii)

Ar$^1$ and Ar$^2$ are independently at each occurrence a C$_5$-C$_{30}$ aromatic radical, R$^1$ and R$^2$ are independently at each occurrence a C$_1$-C$_3$ aliphatic radical or a C$_3$-C$_{20}$ cycloaliphatic radical, and * represents the bonding site;

(B) about 25 weight percent to about 60 weight percent of a first difunctional cyanate ester having a structure (II), or a prepolymer thereof

  (II)

wherein Ar$^3$ is a C$_5$-C$_{30}$ aromatic radical, R$^3$ is a bond or a C$_1$-C$_2$ aliphatic radical;

(C) about 10 weight percent to about 30 weight percent of a second difunctional cyanate ester having a structure (III), or a prepolymer thereof

  (III)

wherein Ar$^4$ is a C$_5$-C$_{30}$ aromatic radical, and R$^5$ is a C$_3$-C$_{10}$ aliphatic radical;

(D) about 5 weight percent to about 25 weight percent of a thermally conductive filler comprising boron nitride; and (E) about 5 weight percent to about 15 weight percent of a toughener, wherein the toughener comprises a thermoplastic polymer, a reactive cyanate ester, or a combination thereof.

2. The electrical machine of claim 1, wherein the thermoplastic polymer comprises a polyimide.

3. The electrical machine of claim 1, wherein the toughener comprises a polyimide comprising structural units having a formula (XI):

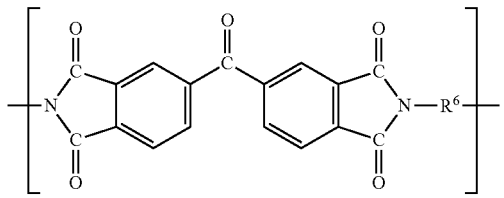  (XI)

wherein R$^6$ is a C$_3$-C$_{10}$ aliphatic radical; a C$_5$-C$_{30}$ aromatic radical, or combinations thereof.

4. The electrical machine of claim 1, wherein the polyfunctional cyanate ester comprises a phenolic novolac cyanate ester, a dicylopentadiene novolac cyanate ester, a 1,2,3-tris(4-cyanatophenyl)-propane, or combinations thereof.

5. The electrical machine of claim 1, wherein the first difunctional cyanate ester comprises a structure having a formula (IV):

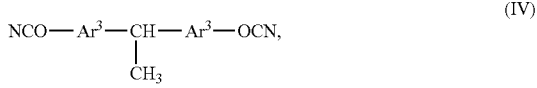  (IV)

wherein Ar$^3$ is a C$_5$-C$_{30}$ aromatic radical.

6. The electrical machine of claim 1, wherein the second difunctional cyanate ester comprises a prepolymer of a difunctional cyanate ester having a formula (V):

  (V)

wherein Ar$^4$ is a C$_5$-C$_{30}$ aromatic radical, and R$^4$ is C$_3$-C$_{20}$ aliphatic radical.

7. The electrical machine of claim 1, wherein the second difunctional cyanate ester comprises a prepolymer of a difunctional cyanate ester having a formula (VI):

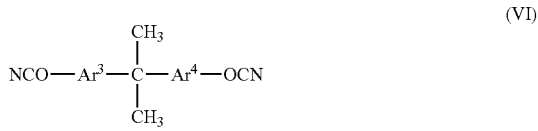  (VI)

wherein Ar$^4$ is a C$_5$-C$_{30}$ aromatic radical.

8. The electrical machine of claim 1, further comprising about 25 ppm to about 150 ppm of a catalyst.

9. The electrical machine of claim 8, wherein the catalyst comprises copper acetylacetonate, cobalt acetylacetonate, aluminum acetylacetonate, or combinations thereof.

10. The electrical machine of claim 1, wherein the curable composition has a viscosity less than about 5000 centiPoise at 100° C.

11. The electrical machine of claim 1, wherein a cured composition of the curable composition has a thermal conductivity in a range from about 0.75 W/mK to about 1.2 W/mK.

12. The electrical machine of claim 1, wherein a cured composition of the curable composition has a glass transition temperature equal to or greater than 280° C.

13. The electrical machine of claim 1, wherein the electrical machine is selected from the group consisting of a motor, a generator, a transformer, a toroid, an inductor, and combinations thereof.

14. The electrical machine of claim 1, wherein the electrical machine is a generator, and a stator of the generator comprises the electrically insulating encapsulating material.

15. An electrical machine comprising an electrically insulating encapsulating material, wherein the electrically insulating encapsulating material comprises a cured composition of a curable composition, the curable composition comprising:

(A) about 14 weight percent to about 18 weight percent of a polyfunctional cyanate ester having a structure (I)

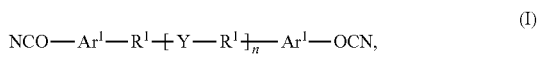  (I)

wherein "n" is an integer equal to or greater than 1, Y has a structure (i) or (ii)

  (i)

  (ii)

Ar$^1$ and Ar$^2$ are independently at each occurrence a C$_5$-C$_{30}$ aromatic radical, R$^1$ and R$^2$ are independently at each occurrence a C$_1$-C$_3$ aliphatic radical or a C$_3$-C$_{20}$ cycloaliphatic radical, and * represents the bonding site;

(B) about 32 weight percent to about 40 weight percent of a first difunctional cyanate ester having a structure (II), or a prepolymer thereof

  (II)

wherein Ar$^3$ is a C$_5$-C$_{30}$ aromatic radical, R$^3$ is a bond or a C$_1$-C$_2$ aliphatic radical;

(C) about 18 weight percent to about 22 weight percent of a second difunctional cyanate ester having a structure (III), or a prepolymer thereof $$NCO-Ar^4-R^5-Ar^4-OCN, \qquad (III)$$

wherein $Ar^4$ is a $C_5$-$C_{30}$ aromatic radical, and $R^5$ is a $C_3$-$C_{10}$ aliphatic radical;

(D) about 18 weight percent to about 22 weight percent of a thermally conductive filler comprising boron nitride; and (E) about 5 weight percent to about 15 weight percent of a toughener, wherein the toughener comprises a thermoplastic polymer, a reactive cyanate ester, or a combination thereof.

* * * * *